March 30, 1948.  A. L. PARKER  2,438,679
MANIFOLD TUBE COUPLING
Filed May 15, 1945
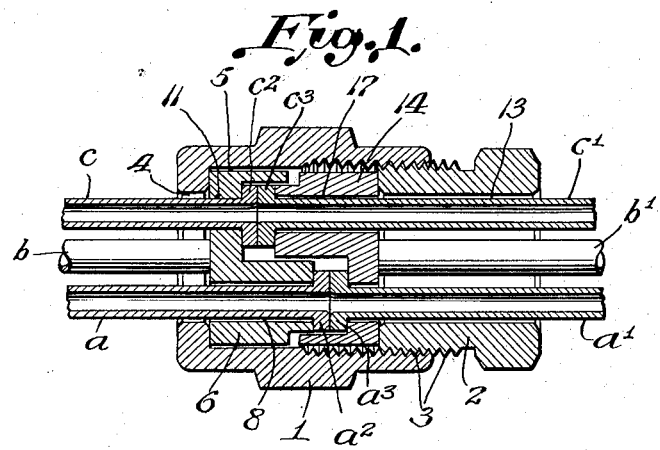
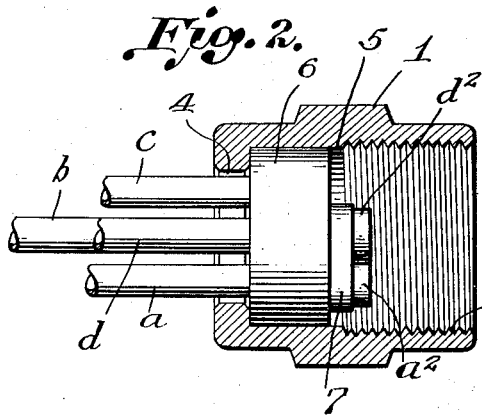 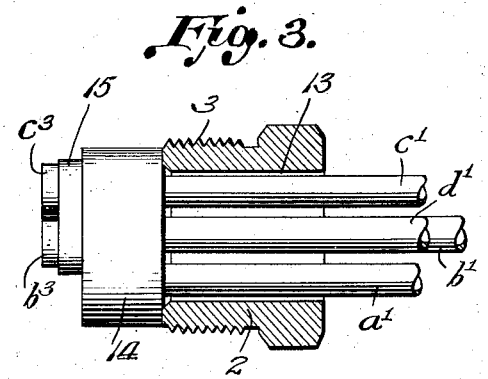
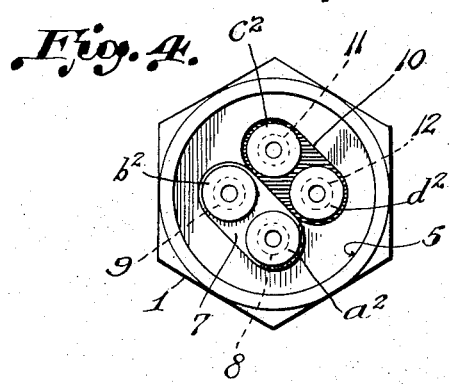 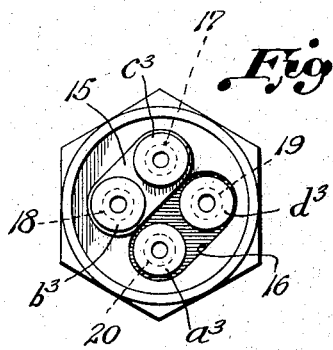
Inventor
ARTHUR L. PARKER, Deceased,
By HELEN M. PARKER, Executrix,
AND LORAIN N. VANDERVOORT
By Mason, Porter & Diller
Attorneys Patented Mar. 30, 1948

2,438,679

UNITED STATES PATENT OFFICE 2,438,679

MANIFOLD TUBE COUPLING

Arthur L. Parker, deceased, late of Cleveland, Ohio, by Helen M. Parker, executrix, Shaker Heights, and Lorain N. Vandervoort, Cleveland, Ohio, assignors to The Parker Appliance Company, Cleveland, Ohio, a corporation of Ohio Application May 15, 1945, Serial No. 593,800

5 Claims. (Cl. 285—21)

The invention relates to new and useful improvements in manifold tube couplings, that is, a coupling for joining a group of tubes.

An object of the invention is to provide a coupling of the above type wherein certain selected tubes will be connected when the coupling members are assembled.

A further object of the invention is to provide a coupling of the above type wherein the tubes, after being arranged in a desired order for connection, may be connected in the same order whenever the couplings are assembled.

A still further object of the invention is to provide a coupling of the above type for tubes having the ends thereof flared wherein each member is provided with means for selectively arranging the tubes for connection and wherein said positioning means holds the flared ends of selected tubes in sealed contact with each other when the coupling is closed.

In the drawings which show by way of illustration one embodiment of the invention, Figure 1 is a longitudinal sectional view through a manifold coupling embodying the improvements with tubes arranged therein;

Figure 2 is a sectional view of one of the coupling members showing in side elevation the tube positioning member disposed therein;

Figure 3 is a similar view of the other coupling member with its associated positioning member;

Figure 4 is an end view of the structure shown in Figure 2;

Figure 5 is an end view of the structure shown in Figure 3.

The improved coupling as illustrated includes a female member 1 and a male member 2 having a threaded connection as indicated at 3. The female member 1 has a bore 4 therethrough through which a group of tubes may be inserted. As shown in the drawings, there are four tubes $a$, $b$, $c$ and $d$. The female member 1 is counterbored to provide a cylindrical recess 5. Disposed in said cylindrical recess is a cylindrical tube positioning member 6. Said tube positioning member is shaped to conform generally to the recess 5 in the coupling member.

This positioning member 6 has an extension 7 formed with parallel sides and semi-circular ends, as shown in Figure 4. The positioning member 6 is provided with two bores 8 and 9 indicated in broken lines in Figure 4. The positioning member 6 is also provided with a recess 10 which has parallel sides and semi-circular ends. This recess is shaped similar to the extension 7. The positioning member is also provided with bores 11 and 12 which open into the recess 10.

The male member 2 has a bore 13 therethrough through which tubes $a'$, $b'$, $c'$ and $d'$ are inserted. Associated with the male member 2 is a positioning member 14 similar to the positioning member 6. This positioning member has an extension 15 provided with flat parallel sides and semi-circular ends. This extension is shaped to fit within the recess 10 of the positioning member 6. The positioning member 14 is also provided with a recess 16 having parallel sides and semi-circular ends and this recess is shaped to conform to the extension 7 which is adapted to fit therein. The positioning member 14 is provided with bores 17 and 18 which pass through the extension 15 and these bores are adapted to receive the tubes $c'$, $d'$. The positioning member 14 is also provided with bores 19 and 20 which are adapted to receive the tubes $a'$ and $b'$.

In the coupling of the tubes it is desired to join the tube $a$ to the tube $a'$, $b$ to $b'$, $c$ to $c'$ and $d$ to $d'$, whenever the coupling is assembled. The tubes $a$ and $d$ pass through the extension 7 while the tubes $a'$ and $d'$ pass through the positioning member 14 into the recess 16 and therefore when the extension 7 is placed in the recess 16 the tubes $a$ and $a'$ will be brought into alignment and the tubes $d$ and $d'$ will also be brought into alignment. The same is true of the tubes $b$, $b'$ and $c$, $c'$, which are located in the recess 10 and the extension 15, respectively.

In the present embodiment of the invention each tube is provided with a flared end. The tube $a$ has a flared end $a^2$ and the tube $a'$ has a flared end $a^3$. The tube $c$ has a flared end $c^2$ and the tube $c'$ has a flared end $c^3$. The other tubes $b$ and $d$ are similarly flared and when the couplings are assembled the tubes are not only brought into alignment, but the flared ends of the tubes are brought into abutted relation. The positioning members are so dimensioned that when the nut is turned into the female member the positioning member 14 will bear against the flanges of the tubes associated therewith and will press the flanges of the tubes against the flanges of the tubes associated with the positioning member 6. This forcing of the flanges of the tubes into intimate contact seals the connection between the tubes. Whenever it is desired to disconnect the tubes the coupling members are separated, and when it is again desired to connect the tubes the coupling members will be reassembled and the same selected tubes will be connected with each other.

It is obvious that many changes in the details of construction and arrangement of the parts may be made without departing from the spirit of the invention as set forth in the appended claims. It is essential, however, that the coupling members shall have associated therewith devices in which the tubes may be inserted in a selected order, which devices ensure that the tubes shall be connected in the order selected whenever the coupling members are assembled.

While the coupling is illustrated as used in connection with four tubes, it will be understood that the group of tubes which are to be connected may consist of two or any desired number of tubes within certain limits and, of course, the positioning members will be slightly modified so as to provide a bore for each tube whereby the tubes are maintained in a certain order for connection.

We claim:

1. A coupling for a group of tubes comprising coupling members having a threaded connection, said coupling members when connected being provided with bores in alignment through which groups of tubes to be connected may be inserted, said coupling members being provided with a recess, opposed tube positioning members in said recess each of said positioning members having a separate bore for each tube of the group associated therewith in which the tubes may be arranged in a desired order, and means ensuring the connection of certain selected tubes in the group when said coupling members are joined.

2. A coupling for a group of tubes comprising coupling members having a threaded connection, said coupling members when connected being provided with bores in alignment through which groups of tubes to be connected may be inserted, said coupling members being provided with a recess, opposed tube positioning members in said recess each positioning member having a separate bore for each tube of the group associated therewith in which the tubes may be arranged in a desired order, and cooperating locating devices carried by the positioning members for ensuring the connection of certain selected tubes therein when said coupling members are joined.

3. A coupling for a group of tubes comprising coupling members having a threaded connection, said coupling members when connected being provided with bores in alignment through which groups of tubes to be connected may be inserted, said coupling members being provided with a recess, opposed tube positioning members in said recess each of said positioning members having a separate bore for each tube of the group associated therewith, said positioning members being in alignment and each having an extension adapted to fit within a recess in the opposed positioning member whereby the connection of certain selected tubes in the group is ensured when the coupling members are joined.

4. A coupling for a group of tubes comprising coupling members having a threaded connection, said coupling members when connected being provided with bores in alignment through which groups of tubes to be connected may be inserted, said coupling members being provided with a recess, opposed tube positioning members in said recess each member having a separate bore for each tube of the group associated therewith in which the tubes may be arranged in a desired order and cooperating locating devices carried by the positioning members for ensuring the connection of certain selected tubes therein when said coupling members are joined, the end of said positioning members being spaced from each other so as to permit the ends of the tubes to be projected therefrom and make abutting contact when the coupling is closed.

5. A coupling for a group of tubes comprising coupling members having a threaded connection, said coupling members when connected being provided with bores in alignment through which groups of tubes to be connected may be inserted, said coupling members being provided with a recess, opposed tube positioning members in said recess, said tube positioning members having separate bores therethrough in alignment for the tubes to be joined, each positioning member having an extension adapted to enter a similarly shaped recess in the opposed extension, the ends of said positioning members being spaced from each other so as to permit the ends of the tubes to be expanded so as to overlie the ends of the positioning members whereby said tube ends will be forced into intimate sealed contact with each other when the coupling is closed.

HELEN M. PARKER,
*Executrix for Arthur L. Parker, Deceased.*
LORAIN N. VANDERVOORT.

REFERENCES CITED

The following references are of record in the file of this patent:

UNITED STATES PATENTS

| Number | Name | Date |
|---|---|---|
| 2,328,468 | Laffly | Aug. 31, 1943 |
| 2,391,063 | Madsen | Dec. 18, 1945 |